(No Model.)

J. E. & J. B. VAIL.
THILL COUPLING PIN.

No. 381,659. Patented Apr. 24, 1888.

Witnesses.
Charles R. Burr.
Thomas Durant.

Inventors.
John E. Vail.
James B. Vail.
by Franck D. Johns.
their Attorney.

UNITED STATES PATENT OFFICE.

JOHN E. VAIL AND JAMES B. VAIL, OF FAIRFIELD, MICHIGAN.

THILL COUPLING-PIN.

SPECIFICATION forming part of Letters Patent No. 381,659, dated April 24, 1888.

Application filed August 12, 1887. Serial No. 246,795. (No model.)

*To all whom it may concern:*

Be it known that we, JOHN E. VAIL and JAMES B. VAIL, citizens of the United States, residing at Fairfield, in the county of Lenawee and State of Michigan, have invented certain new and useful Improvements in Coupling-Pins for Thill-Couplings; and we do hereby declare the following to be a full, clear, and exact description of the invention, such as will enable others skilled in the art to which it appertains to make and use the same.

Our invention relates to certain improvements in coupling-pins for thill-couplings which are provided with spring locking-shackles; and it consists in certain novelty in the construction of the same, which we will now proceed to point out and describe, reference being had to the accompanying drawings, in which—

Figure 1:
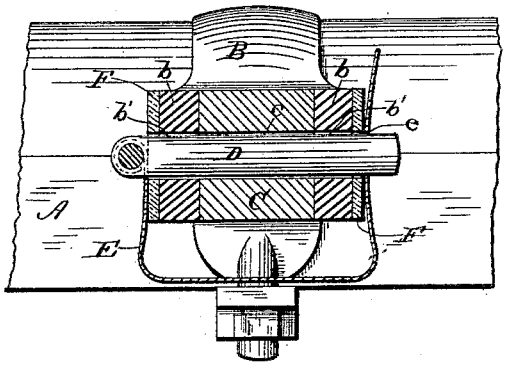
Figure 2:
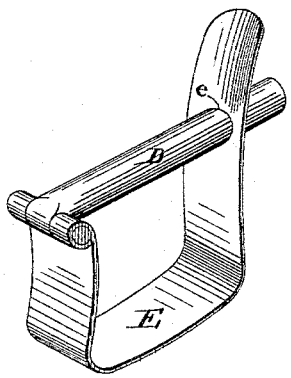

Figure 1 is a transverse section taken through a thill-coupling provided with our invention. Fig. 2 is a perspective of the coupling-pin and its spring locking-shackle removed from the thill-coupling.

Referring to said drawings, A represents a portion of the axle of a vehicle; B, a clip secured to the same in the ordinary manner, said clip being provided with the usual projecting ears or lugs, b b, between which is secured the end of the shank of the thill C. The ears or lugs b b are provided with apertures b' b', and the shank of the thill with an aperture, c, through which the coupling pin passes to secure the thill in place.

D is a coupling-pin having a T-shaped head.

E is a U-shaped spring locking shackle having the end of one of its arms bifurcated, the bifurcated end being bent around the T-shaped head, so as to hinge said shackle to the head of the pin. The opposite arm of the shackle is provided with an aperture, e, adapted to receive the free end of the pin. Projecting beyond the aperture is an outwardly-inclined extension. To secure the thill to the clip, the pin D is passed through the apertures b' b' in the ears or lugs b b and through the aperture c in the thill-shank. The spring-shackle is then moved until the pin engages with the inclined extension of its free arm, and is expanded until the free end of the pin passes through the aperture e. Said shackle then springs back to its normal position, and thus securely locks the pin in place.

The spring-shackle not only serves to lock the pin securely in place, but also to prevent the thill-coupling from rattling.

F F are rubber or leather washers which aid in preventing the thill from rattling. Instead of the rubber or leather washers, light coil-springs may be used.

To remove the coupling-pin, the free end of the shackle is pulled out until the free end of the pin is released from the aperture e. The shackle is then drawn back to the position shown in dotted lines. The pin can then be withdrawn.

The above-described bolt and locking-shackle may be used to advantage with various kinds of bolts, where bolts and nuts or bolts and keys are now used.

We are aware that coupling-pins have been provided with independent spring-shackles engaging with opposite ends of said coupling-pins to retain them in place. We are also aware that coupling-pins have been provided with spring-shackles rigidly secured to one end of the coupling-pin. Therefore we do not claim, broadly, a coupling-pin provided with a spring locking-shackle; but What we do claim as new, and desire to secure by Letters Patent, is—

1. The combination, with the coupling-pin, of the U-shaped spring locking-shackle hinged at the end of one of its arms to the head of the coupling-pin D, provided with an aperture in its free arm adapted to receive the free end of the pin, substantially as shown and described.

2. The combination, with the coupling-pin D, having the T-shaped head, of the U-shaped spring locking-shackle E, having the end of one of its arms bifurcated and bent around the T-shaped head, so as to hinge the shackle to said head, and provided in its free arm with an aperture, e, adapted to receive the free end of the pin, and an outwardly-inclined extension projecting beyond said aperture, substantially as shown and described.

3. The clip B, having projecting lugs or ears b b, provided with apertures b' b', and the thill-shank C, having the aperture c, in combination with the coupling-pin D, having the U-shaped spring locking-shackle E, hinged at the end of one of its arms to the head of the pin, and provided in its free arm with an aperture, e, adapted to receive the free end of the pin, substantially as shown and described.

In testimony whereof we affix our signatures in presence of two witnesses.

JOHN E. VAIL.
JAMES B. VAIL.

Witnesses:
R. B. ROBBINS,
W. P. STRAIGHT.